(12) United States Patent
Maltsev et al.

(10) Patent No.: US 8,064,532 B2
(45) Date of Patent: Nov. 22, 2011

(54) METHOD AND SCHEME FOR SPACE-TIME CODED COCHANNEL INTERFERENCE CANCELLATION

(76) Inventors: Alexander Alexandrovich Maltsev, Nizhny Novgorod (RU); Alexey Vladimirovich Khoryaev, Dzerzhinsk (RU); Roman Olegovich Maslennikov, Nizhny Novgorod (RU); Vladimir Alexandrovich Pestretsov, Nizhny Novgorod (RU); Quinghua Li, Sunnyvale, CA (US); Yang-Seok Choi, Portland, OR (US)

( * ) Notice: Subject to any disclaimer, the term of this patent is extended or adjusted under 35 U.S.C. 154(b) by 668 days.

(21) Appl. No.: 12/088,496

(22) PCT Filed: Sep. 30, 2005

(86) PCT No.: PCT/RU2005/000490
§ 371 (c)(1),
(2), (4) Date: Nov. 14, 2008

(87) PCT Pub. No.: WO2007/037714
PCT Pub. Date: Apr. 5, 2007

(65) Prior Publication Data
US 2009/0175366 A1    Jul. 9, 2009

(51) Int. Cl.
*H04B 7/02* (2006.01)
*H04L 1/02* (2006.01)
(52) U.S. Cl. ........ 375/267; 375/260; 375/346; 375/347; 375/349; 370/203; 370/204; 370/208
(58) Field of Classification Search ............... 375/260, 375/267, 346–350; 370/203–211
See application file for complete search history.

(56) References Cited

U.S. PATENT DOCUMENTS

| | | | |
|---|---|---|---|
| 7,206,353 B2 | 4/2007 | Kim et al. | |
| 2005/0107057 A1* | 5/2005 | Sun | 455/272 |
| 2005/0213682 A1 | 9/2005 | Han et al. | |
| 2006/0109891 A1* | 5/2006 | Guo et al. | 375/147 |
| 2006/0182208 A1* | 8/2006 | Lee et al. | 375/347 |

FOREIGN PATENT DOCUMENTS

| | | |
|---|---|---|
| KR | 1020000002214 | 1/2000 |
| KR | 20030017946 | 3/2003 |
| KR | 20050089698 | 9/2005 |
| WO | 2007/037714 | 4/2007 |

OTHER PUBLICATIONS

First Office Action Mailed Mar. 19, 2010, Korean Patent Application No. 2008-7010170.
Athanasiadis, T. et al., "Space-Time OFDM with Adaptive Beamforming for Wireless Multimedia Applications", Third International Conference on Information Technology and Applications (ICITA'05), (Jul. 4, 2005), pp. 381-386.

(Continued)

*Primary Examiner* — Curtis Odom
(74) *Attorney, Agent, or Firm* — Kacvinsky Daisak PLLC

(57) ABSTRACT

An apparatus, system, and method for space-time cochannel interference cancellation are described. The apparatus may include a time stacking module to stack consecutive subcarrier signals for a period of time equal to several symbols and a space-time subcarrier beamformer module to perform space-time subcarrier beamforming by applying space-time beamformer weights to stacked symbols on one or more subcarriers. The space-time beamformer weights may be calculated based on spatial and time correlation properties of one or more interference signals. Other embodiments are described and claimed.

30 Claims, 5 Drawing Sheets

OTHER PUBLICATIONS

Thomas, T. A., et al., "Novel Receiver Signal Processing for Interference Cancellation and Equalization in Cellular TDMA Communication", 1997 IEEE International Conference on Acoustics, Speech, and Signal Processing. Statistical Signal and Array Processing, Applications, Munich, IEEE International Conference on Acoustics, Speech, and Signal Processing (ICASSP), LOS, 5, (Apr. 21, 1997), pp. 3881-3884.

Shengli, Z. et al., "Optimal Transmitter Eigen-Beamforming and Space-Time Block Coding Based on Channel Correlations", IEEE Transcations on Information Theory, 49(7), (Jul. 2003), pp. 1681-1683.

Li, J. et al., "Co-Channel Interference Cancellation for Space-Time Coded OFDM Systems", IEEE Transactions on Wireless Communications, 2(1), (Jan. 2003), pp. 41-49.

* cited by examiner

METHOD AND SCHEME FOR SPACE-TIME CODED COCHANNEL INTERFERENCE CANCELLATION

BACKGROUND

Modern wireless communication systems may operate according to Institute of Electrical and Electronics Engineers (IEEE) standards such as the 802.11 standards for Wireless Local Area Networks (WLANs) and the 802.16 standards for Wireless Metropolitan Area Networks (WMANs). Worldwide Interoperability for Microwave Access (WiMAX) is a wireless broadband technology based on the IEEE 802.16 standard of which IEEE 802.16-2004 and the 802.16e amendment are Physical (PHY) layer specifications. IEEE 802.16-2004 supports several multiple-antenna techniques including Alamouti Space-Time Coding (STC), Multiple-Input Multiple-Output (MIMO) antenna systems, and Adaptive Antenna Systems (AAS).

Frequency reuse in cell-based WMANs and WLANs leads to the appearance of cochannel interference. Cochannel interference is considered as a main limiting factor that restricts spectral efficiency and capacity of high-throughput wireless systems. Future wireless communication systems are expected to support many MIMO transmission techniques such as STC and spatial multiplexing. It is evident that variety of adopted transmission techniques will cause different types of complex MIMO interferences such as MIMO space-time coded cochannel interference from a neighboring station which simultaneously transmits signal combination from several antennas.

Traditional cochannel interference cancellation (CIC) techniques are based on using difference in spatial correlations of useful and interference signals only. Such "space-only" CIC techniques do not take into account signal time correlation properties. Therefore, to suppress complex MIMO interference, it is necessary for the receiver side to have additional antenna elements equal to the number of transmit antennas at the interference source. To cancel Alamouti space-time interference, for example, it is necessary for a system to employ two additional receive antennas.

DETAILED DESCRIPTION

Figure 1:
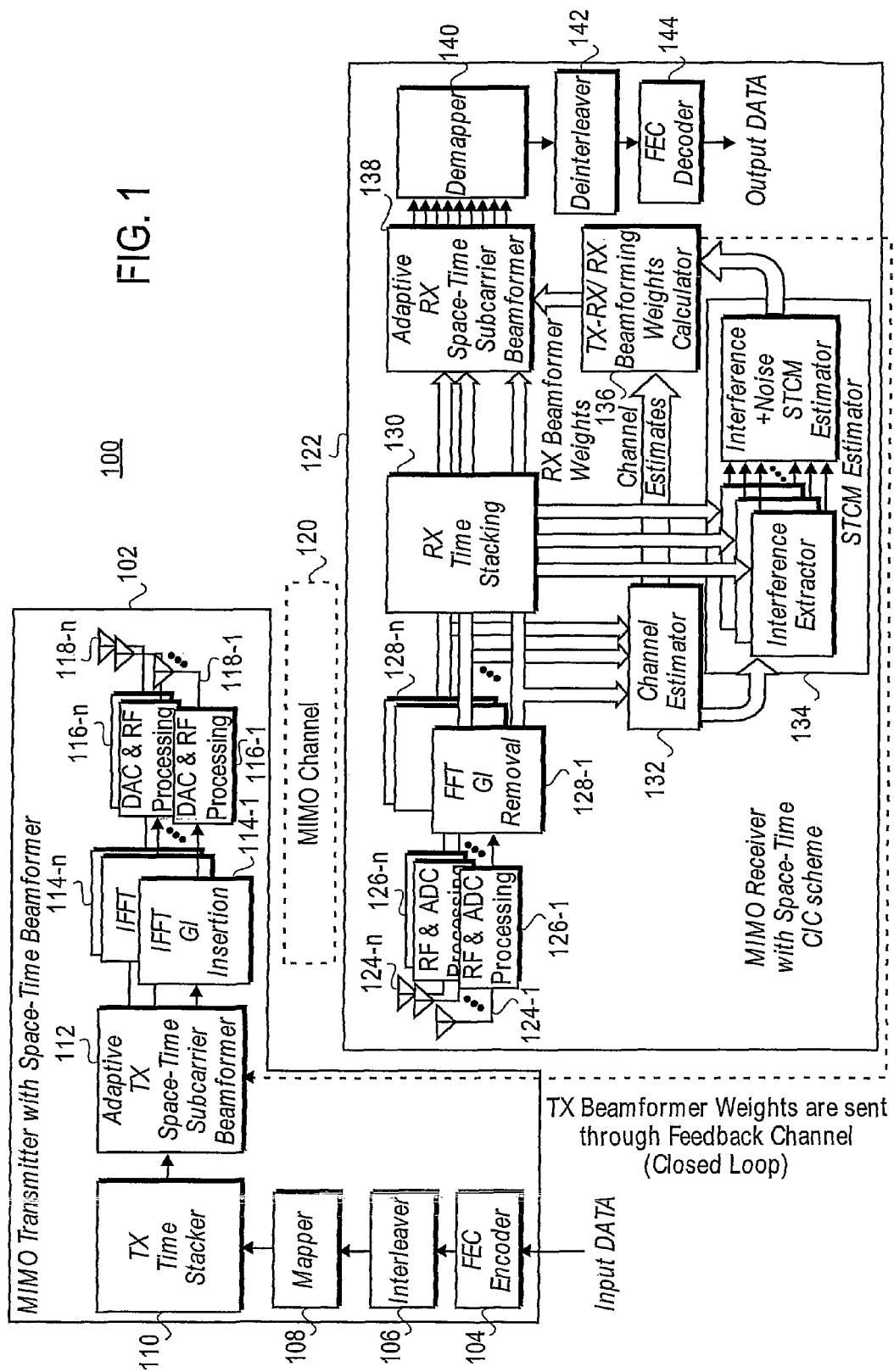
FIG. 1 illustrates one embodiment of a system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), and so forth. In various embodiments, for example, the communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. The communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes arranged to communicate information over one or more wired and/or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

The communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

The communications system 100 may form part of a multi-carrier system such as a MIMO system. The MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using multiple antennas. In various embodiments, for example, the MIMO system may comprise multiple transmit antennas $N_T$ and multiple receive antennas $N_R$, where $N_T$ and $N_R$ represent equal or unequal positive integer values. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the communications system 100 may be arranged to perform a space-time cochannel interference cancellation (ST CIC) technique. The ST CIC technique may provide CIC for different types of interferences and, in particular, space-time coded interferences that cause performance degradation in a MIMO system. The ST CIC technique may improve performance of a MIMO system relative to traditional "space-only" CIC schemes. The ST CIC technique may provide improved performance of a MIMO system in the presence of space-time coded interferences by exploiting specific space-time correlation properties of the interference signals. In various implementations, the ST CIC technique may achieve cancellation of space-time coded interference through joint space-time optimization of transmit and receive beamformer weights by exploiting spatial and time correlation of interference signals. The ST CIC technique may be applied for both closed-loop and open-loop applications, such as synchronous open or closed-loop MIMO-OFDM systems. The embodiments are not limited in this context.

FIG. 1 illustrates a communications system 100 configured to perform the ST CIC technique. In various embodiments, the system 100 may comprise a PHY layer component of wireless LAN devices either hardware or software based on IEEE standards 802.11a, n and 802.16, for example. In one embodiment, for example, the communications system 100 may comprise an OFDM transceiver for a closed-loop MIMO-OFDM system. The embodiments are not limited in this context.

As shown in FIG. 1, the communications system 100 may be illustrated and described as comprising several separate functional elements, such as modules and/or blocks. In various embodiments, the modules and/or blocks may be connected by one or more communications media. Communications media generally may comprise any medium capable of carrying information signals. For example, communication media may comprise wired communication media, wireless communication media, or a combination of both, as desired for a given implementation.

The modules and/or blocks may comprise, or be implemented as, one or more systems, sub-systems, processors, devices, machines, tools, components, circuits, registers, applications, programs, subroutines, or any combination thereof, as desired for a given set of design or performance constraints. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

The communications system 100 may comprise a transmitter node 102. In one embodiment, for example, the transmitter node 102 may comprise a MIMO transmitter to transmit OFDM communication signals over a multicarrier communication channel.

The transmitter node 102 may comprise an encoder module 104. In various embodiments, the encoder module 104 may be arranged to generate an encoded bit sequence from input data flow. The encoder module 104 may use various coding rates (e.g., ½, ⅔, ¾) depending on the puncturing pattern. In one embodiment, for example, the encoder module 104 may comprise an error-correcting encoder, such as a forward error correcting (FEC) encoder, and may generate a bit sequence encoded with an FEC code. In other embodiments, the encoder 104 may comprise a convolutional encoder. The embodiments are not limited in this context.

The transmitter node 102 may comprise an interleaver module 106. In various embodiments, the interleaver module 106 may perform interleaving on the bits of the encoded bit sequence. In one embodiment, for example, the interleaver module 106 may comprise a frequency interleaver. The embodiments are not limited in this context.

The transmitter node 102 may comprise a mapper module 108. In various embodiments, the mapper module 108 may map the interleaved bit sequence into a sequence of transmit symbols. In one embodiment, for example, the mapper module 108 may map the interleaved bit sequence into a sequence of OFDM symbols. Each OFDM symbol may comprise N frequency subcarriers, with N representing a positive integer (e.g., 16, 64). In various implementations, the mapper module 108 may map the transmit symbols to subcarrier signals of a multicarrier communication channel.

The transmitter node 102 may comprise a transmit (TX) time stacking module 110. In various embodiments, such as in closed-loop MIMO systems, the TX time stacking module 110 may be arranged to stack consecutive subcarrier signals for a period of time equal to several transmit symbols. In one embodiment, for example, the time period may comprise two OFDM symbols for cancellation of Alamouti STC interference. In various implementations, the period of time may be predefined during system design based on a priori knowledge of available space-time interferences at the receiver side or may be set adaptively based on information provided by receiver through a feedback channel.

The transmitter node 102 may comprise an adaptive TX space-time subcarrier beamformer module 112. In various embodiments, such as in closed-loop MIMO systems, the adaptive TX space-time subcarrier beamformer module 112 may be arranged to apply TX beamformer weights to the transmit symbols from the stack on each subcarrier or each subcarrier set. In various implementations, the space-time beamformer weights may be provided to the transmitter node 102 using feedback that is available in communications systems supporting closed-loop MIMO. Accordingly, the structure of the TX space-time beamformer module 112 may be adaptively adjusted to space-time interference environment at the RX side.

In various embodiments, such as in closed-loop MIMO-OFDM systems, the adaptive TX space-time subcarrier beamformer module 112 may be arranged to perform a Space-Time Beamforming (STB) signal processing technique at the transmitter side. Table 1 illustrates one embodiment of performing the STB signal processing technique as compared to traditional transmitter spatial beamforming, where $[y_1[0], y_2[0]]^T$ and $[y_1[1], y_2[1]]^T$ are signals transmitted from first and second antennas for two consecutive periods of time and $$\tilde{V}_{4\times 2} = \begin{bmatrix} \tilde{V}_{2\times 2}[0] \\ \tilde{V}_{2\times 2}[1] \end{bmatrix}$$

is a composite space-time transmit beamforming matrix.

TABLE 1

| A) TX Processing in the presence of Alamouti Cocahnnel Intereference | | |
|---|---|---|
| TX Processing Technique | Signals transmitted at the first period of time | Signals transmitted at the second period of time |
| TX Space-Time Beamforming | $\begin{bmatrix} y_1[0] \\ y_2[0] \end{bmatrix} = \tilde{V}_{2\times 2}[0] \cdot \begin{bmatrix} s[0] \\ s[1] \end{bmatrix}$ | $\begin{bmatrix} y_1[1] \\ y_2[1] \end{bmatrix} = \tilde{V}^*_{2\times 2}[1] \cdot \begin{bmatrix} s^*[0] \\ s^*[1] \end{bmatrix}$ |
| TX Spatial Beamforming | $\begin{bmatrix} y_1[0] \\ y_2[0] \end{bmatrix} = V_{2\times 1} \cdot s[0]$ | $\begin{bmatrix} y_1[1] \\ y_2[1] \end{bmatrix} = V_{2\times 1} \cdot s[1]$ |
| B) TX Processing in the absence of Cocahnnel Intereference | | |
| TX Processing Technique | Signals transmitted at the first period of time | Signals transmitted at the second period of time |
| TX Space-Time Beamforming | $\begin{bmatrix} y_1[0] \\ y_2[0] \end{bmatrix} = [V_{2\times 1} \; 0_{2\times 1}] \cdot \begin{bmatrix} s[0] \\ s[1] \end{bmatrix}$ | $\begin{bmatrix} y_1[1] \\ y_2[1] \end{bmatrix} = [0_{2\times 1} \; V_{2\times 1}] \cdot \begin{bmatrix} s[0] \\ s[1] \end{bmatrix}$ |
| TX Spatial Beamforming | $\begin{bmatrix} y_1[0] \\ y_2[0] \end{bmatrix} = V_{2\times 1} \cdot s[0]$ | $\begin{bmatrix} y_1[1] \\ y_2[1] \end{bmatrix} = V_{2\times 1} \cdot s[1]$ |

As shown in Table 1, two situations are presented: A) transmit (TX) signal processing in the presence of Alamouti interference and B) TX processing in the absence of cochannel interference at the receive (RX) side. It can be appreciated from the first row of Table 1 that the TX STB processing (case A) is transformed to traditional TX spatial beamforming scheme (case B) in the absence of interference signal.

The transmitter node 102 may comprise inverse fast Fourier transform (IFFT) modules 114-1-$n$, where n represents a positive integer value. In various embodiments, the IFFT modules 114-1-$n$ may be arranged to convert OFDM symbols to time-domain signals. In various implementations, the IFFT modules 114-1-$n$ may perform guard interval (GI) insertion. In such implementations, GI insertion may comprise inserting a time-domain guard interval between OFDM symbols to reduce inter-symbol interference.

The transmitter node 102 may comprise digital-to-analog conversion (DAC) and radio-frequency (RF) processing modules 116-1-$n$, where n represents a positive integer value. In various embodiments, the DAC and RF processing modules 116 may be arranged to perform DAC processing and to generate RF signals for transmission on the spatial channels of a multicarrier communication channel.

The transmitter node 102 may comprise transmit antennas 118-1-$n$, where n represents a positive integer value. In various embodiments, each of the transmit antennas 118-1-$n$ may correspond to one of the spatial channels of a multicarrier communications channel.

The transmitter node 102 may transmit information over communication channel 120. In various embodiments, the communication channel 120 may comprise a multicarrier communication channel, such as a MIMO channel, for communicating multicarrier communication signals such as OFDM signals. The MIMO channel may comprise, for example, a wideband channel comprising multiple subchannels. Each subchannel may comprise closely spaced orthogonal data subcarriers allowing a single OFDM symbol to be transmitted together by the data subcarriers. The embodiments are not limited in this context.

The communications system 100 may comprise a receiver node 122 for receiving information over communication channel 120. In various embodiments, the receiver node 122 may comprise receive antennas 124-1-$n$, where n represents a positive integer value. In various implementations, each of the receive antennas 124-1-$n$ may correspond to one of the spatial channels of a multicarrier communications channel.

The receiver node 122 may comprise RF and analog-to-digital conversion (ADC) processing modules 126-1-$n$, where n represents a positive integer value. In various embodiments, the RF and ADC processing modules 126-1-$n$ may be arranged to perform RF and ADC processing on signals received on the spatial channels of a multicarrier communication channel.

The receiver node 122 may comprise fast Fourier transform (FFT) modules 128-1-$n$, where n represents a positive integer value. In various embodiments, the FFT modules 128-1-$n$ may be arranged to convert time-domain signals to frequency-domain signals. In various implementations, the FFT modules 128-1-$n$ may perform GI removal. In such implementations, GI removal may comprise removing a time-domain guard interval between OFDM symbols.

The receiver node 122 may comprise a receive (RX) time stacking module 130. In various embodiments, the RX time stacking module 130 may be arranged to stack, at each subcarrier, received signals for period of time equal to several symbols. In various implementations, the period of time may be predefined during system design or may be set adaptively. In one embodiment, for example, the time period may comprise two OFDM symbols for cancellation of Alamouti STC interference.

The receiver node 122 may comprise a channel estimator module 132. In various embodiments, the channel estimator module 132 may be arranged to calculate channel estimates for determining beamforming weights.

The receiver node 122 may comprise a space-time correlation matrix (STCM) estimator module 134. The STCM estimator module 134 may be arranged to receive the stacked OFDM symbols output from the receive time stacking module 130 for STCM estimation. In various embodiments, the STCM estimator module 134 may perform extraction of interference and noise signals and calculation of interference and noise STCM estimates for each subcarrier or set of adjacent subcarriers. In various implementations, the interference and noise STCM estimates $R_{zz}$ at each subcarrier may be extended to incorporate symbols from several time intervals. For example in case of Alamouti coded interference the STCM estimate $R_{zz}$ may be written for two consecutive symbols and may be represented as follows:

$$R_{zz} = <z_{2N_R \times 1} \cdot z_{2N_R \times 1}^H>,$$

where:

$<\ldots>$ is averaging operator, superscript $^H$ denotes complex conjugate transpose, and $z_{2N_R \times 1}$ is the space-time interference and noise vector that is composed from 2 consecutive symbols and for example of Alamouti coded interference may be defined by equation:

$$z_{2N_R \times 1} = \begin{bmatrix} G_{N_R \times 2} & 0_{N_R \times 2} \\ 0_{N_R \times 2} & G_{N_R \times 2}^* \end{bmatrix} \cdot \begin{bmatrix} x_1[0] \\ x_2[0] \\ -x_2[0] \\ x_1[0] \end{bmatrix} + \begin{bmatrix} n_{N_R \times 1}[0] \\ n_{N_R \times 1}^*[1] \end{bmatrix}.$$

here, $G_{N_R \times 2}$—is the channel transfer matrix of interference signal, $n_{N_R \times 1}[0], n_{N_R \times 1}[0]$—are the noise vectors for two consecutive periods of time, $x_1[0], x_2[0]$—are Alamouti coded interference signals.

It can be appreciated that interference and noise STCM estimates may be obtained by extending traditional schemes for spatially correlated signals to take into account correlation in time.

The receiver node 122 may comprise a beamforming weights calculator module 136. In various embodiments, such as in closed-loop MIMO systems, the beamforming weights calculator module 136 may be arranged to provide TX and/or RX receive space-time subcarrier beamformers with corresponding weights. In various implementations, beamforming weights calculation may be performed on the basis of channel estimates from the channel estimator module 132 and the interference and noise STCM estimates from the STCM estimator module 134. For the example of Alamouti coded interference, the optimal space-time beamforming weights $\tilde{V}_{4 \times 2}$ and $\tilde{U}_{2 \times 2N_R}$ may be obtained with interference and noise STCM estimates $R_{zz}$ and an equivalent channel transfer matrix $\tilde{H}_{N_R \times 2}$ estimated based on channel matrix $H_{N_R \times 2}$ as follows:

$$\tilde{H}_{N_R \times 2} = \begin{bmatrix} H_{N_R \times 2} & 0_{N_R \times 2} \\ 0_{N_R \times 2} & H_{N_R \times 2}^* \end{bmatrix}.$$

In various embodiments, such as in closed-loop MIMO systems, the beamforming weights calculator module 136 may send TX beamforming weights through a feedback channel to the adaptive TX space-time subcarrier beamformer 112. In such embodiments, joint space-time beamforming optimization of transmit and receive beamformers may be achieved for STC MIMO cochannel interference cancellation. This joint TX-RX space-time beamforming optimization may provide a significant improvement in bit error rate (BER) performance improvement over open-loop systems employing the ST CIC technique at the receiver RX side only. The embodiments are not limited in this context.

The receiver node 122 may comprise an adaptive RX space-time subcarrier beamformer module 138. The adaptive receive space-time subcarrier beamformer module 138 may be arranged to receive stacked OFDM symbols from the RX time stacking module 130 and to receive RX space-time beamformer weights from the beamforming weights calculator 136. In various implementations, the adaptive receive space-time subcarrier beamformer module 138 may be arranged to apply RX space-time beamformer weights to stacked OFDM symbols to produce linear estimates of the transmitted signal. In various embodiments, such as in open-loop MIMO systems, the adaptive receive space-time subcarrier beamformer module 138 may be arranged to perform a MIMO equalizer function operating simultaneously in space and time dimensions.

The receiver node 122 may comprise a demapper module 140. In various embodiments, the demapper module 140 may be arranged to demap a sequence of symbols, such as a sequence of OFDM symbols. The embodiments are not limited in this context.

The receiver node 122 may comprise a deinterleaver module 142. In various embodiments, the deinterleaver module 142 may perform deinterleaving on the bits of the encoded bit sequence. In one embodiment, for example, the deinterleaver module 142 may comprise a frequency deinterleaver. The embodiments are not limited in this context.

The receiver node 122 may comprise a decoder module 144. In various embodiments, the decoder module 144 may be arranged to decode an encoded bit sequence into an output data flow. The decoder module 144 may use various coding rates (e.g., ½, ⅔, ¾) depending on the puncturing pattern. In one embodiment, for example, the decoder module 144 may comprise an error-correcting encoder, such as an FEC decoder, and may generate an output data flow from a bit sequence encoded with an FEC code. In other embodiments, the encoder 104 may comprise a convolutional decoder. The embodiments are not limited in this context.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 2:
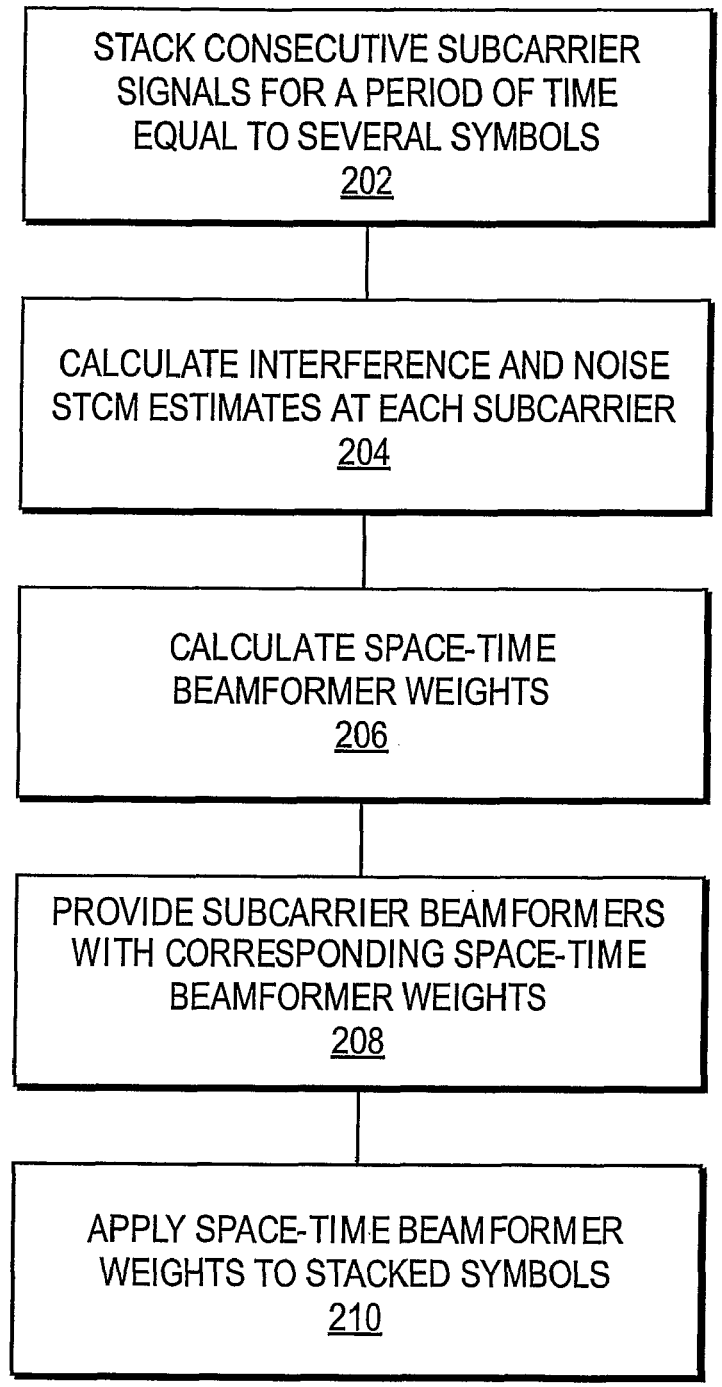
FIG. 2 illustrates one embodiment of a logic flow.

FIG. 2 illustrates one embodiment of a logic flow. FIG. 2 illustrates a logic flow 200 for performing a STC CIC technique. In various embodiments, the logic flow 200 may be performed by various systems, nodes, and/or modules. It is to be understood that the logic flow 200 may be implemented by various other types of hardware, software, and/or combination thereof. The embodiments are not limited in this context.

The logic flow 200 for performing the ST CIC technique may be illustrated using Alamouti coded interference as an example of a space-time coded signal. It can be appreciated, however, that the ST CIC technique may be extended for other types of STC interferences which are correlated in space and time. By taking into account time correlation of interference signals, the ST CIC technique may achieve improved system performance over traditional spatial multiplexing techniques. In addition, exploiting time correlation of interference signals may allow a reduction in the number of additional antennas used for CIC.

For the case of time-aligned (synchronous) Alamouti coded cochannel interference in a closed-loop MIMO-OFDM system with two transmit $N_T=2$ and $N_R$ receive antennas and with one spatial data stream, the received signals at each subcarrier for two consecutive symbol periods can be represented in matrix form as follows:

$$r_{N_R \times 1}[0] = H_{N_R \times 2} \cdot V_{2 \times 1} \cdot s[0] + G_{N_R \times 2} \cdot \begin{bmatrix} x_1[0] \\ x_2[0] \end{bmatrix} + n_{N_R \times 1}[0] \quad (1)$$
$$r_{N_R \times 1}[1] = H_{N_R \times 2} \cdot V_{2 \times 1} \cdot s[1] + G_{N_R \times 2} \cdot \begin{bmatrix} -x_2^*[0] \\ x_1^*[0] \end{bmatrix} + n_{N_R \times 1}[1]$$

where:

$r_{N_R \times 1}[0] = [r_1[0], r_2[0], \ldots, r_{N_R}[0]]^T$ and $r_{N_R \times 1}[1] = [r_1[1], r_2[1], \ldots, r_{N_R}[1]]^T$ are received signal vectors for two consecutive period of times, $H_{N_R \times 2}$ is a channel transfer matrix of a useful signal, $V_{2 \times 1}$ is a transmit beamformer vector, s[0] s[1] are information signals, $x_1[0]$ $x_2[0]$ are Alamouti coded cochannel interference signals, $G_{N_R \times 2}$ is an interference channel transfer matrix, and $n_{N_R \times 1}[0]$ and $n_{N_R \times 1}[1]$ are additive noise vectors.

For consecutive periods of time the transmit signal linear estimates at the receiver side may be represented as follows:

$$\hat{s}[0] = U_{1 \times N_R} \cdot r_{N_R \times 1}[0] \quad (2)$$
$$\hat{s}[1] = U_{1 \times N_R} \cdot r_{N_R \times 1}[1]$$
$$\vdots$$
$$\hat{s}[k] = U_{1 \times N_R} \cdot r_{N_R \times 1}[k],$$

where k is time index of OFDM symbol, and $U_{1 \times N_R}$ is receiver beamforming vector.

It is noted that traditional "space-only" CIC schemes process received signal during each OFDM symbol period independently (in time). It is also noted that the optimal receive $U_{1 \times N_R}$ and transmit $V_{2 \times 1}$ beamforming vectors may be obtained by using a minimum mean square error (MMSE) or a maximum signal-to-noise ratio (SNR) approach. In accordance with these techniques, optimal ("space-only") beamforming vectors can be calculated based on the estimates of channel transfer matrix $H_{N_R \times 2}$ and spatial correlation matrix of interference signals.

The STC CIC technique may achieve improved performance as compared to the traditional spatial multiplexing technique by exploiting space-time correlation properties of the interference signals. In various embodiments, the logic flow 200 may comprise performing signal processing on the period of interference correlation time. For example, Alamouti coded interference has correlation time equal to two symbol periods (time of symbol repetition).

The logic flow 200 may comprise stacking consecutive subcarrier signals for a period of time equal to several symbols at block 202. In various embodiments, the time period may comprise two OFDM symbols for cancellation of Alamouti STC interference. In this case, by stacking two consecutive received vectors ($r_{N_R \times 1}[0]$ and $r_{N_R \times 1}[1]$) and applying complex conjugation to the second symbol $r_{N_R \times 1}[1]$, equations (1) and (2) may be written in equivalent matrix form as follows:

$$\tilde{r}_{2N_R \times 1} = \begin{bmatrix} r_{N_R \times 1}[0] \\ r^*_{N_R \times 1}[1] \end{bmatrix} = \begin{bmatrix} H_{N_R \times 2} & 0_{N_R \times 2} \\ 0_{N_R \times 2} & H^*_{N_R \times 2} \end{bmatrix}. \quad (3)$$

$$\tilde{V}_{4 \times 2} \cdot \begin{bmatrix} s[0] \\ s[1] \end{bmatrix} + \begin{bmatrix} G_{N_R \times 2} & 0_{N_R \times 2} \\ 0_{N_R \times 2} & G^*_{N_R \times 2} \end{bmatrix} \cdot \begin{bmatrix} x_1[0] \\ x_2[0] \\ -x_2[0] \\ x_1[0] \end{bmatrix} + \begin{bmatrix} n_{N_R \times 1}[0] \\ n^*_{N_R \times 2}[1] \end{bmatrix}$$

$$\begin{bmatrix} \hat{s}[0] \\ \hat{s}[1] \end{bmatrix} = \tilde{U}_{2 \times 2N_R} \cdot \tilde{r}_{2N_R \times 1} \quad (4)$$

As it follows from (3) and (4) the beamformer weights $\tilde{V}_{4 \times 2}$ and $\tilde{U}_{2 \times 2N_R}$ have space-time structure. Thus, both spatial and time correlation of useful and interference signals may be extracted.

The logic flow 200 may comprise calculating interference and noise STCM estimates at each subcarrier at block 204. In various embodiments, interference and noise signals are extracted and then STCM estimates are calculated for each subcarrier. In various implementations, the interference and noise STCM estimates $R_{zz}$ at each subcarrier may be represented as follows:

$$R_{zz} = \langle z_{2N_R \times 1} z_{2N_R \times 1}^H \rangle,$$

where:
$\langle \ldots \rangle$ is averaging operator,
superscript $^H$ denotes complex conjugate transpose, and $z_{2N_R \times 1}$ is defined by equation:

$$z_{2N_R \times 1} = \begin{bmatrix} G_{N_R \times 2} & 0_{N_R \times 2} \\ 0_{N_R \times 2} & G^*_{N_R \times 2} \end{bmatrix} \cdot \begin{bmatrix} x_1[0] \\ x_2[0] \\ -x_2[0] \\ x_1[0] \end{bmatrix} + \begin{bmatrix} n_{N_R \times 1}[0] \\ n^*_{N_R \times 1}[1] \end{bmatrix}.$$

It can be appreciated that interference and noise STCM estimates may be obtained by extending traditional schemes for spatially correlated signals to take into account correlation in time.

The logic flow 200 may comprise calculating space-time beamformer weights at block 206. In various embodiments, beamforming weights calculation may be performed on the basis of interference and noise STCM estimates and channel estimates. In various implementations, optimal space-time beamforming weights $\tilde{V}_{4 \times 2}$ and $\tilde{U}_{2 \times 2N_R}$ may be obtained with interference and noise STCM estimates $R_{zz}$ and an equivalent channel transfer matrix $\tilde{H}_{N_R \times 2}$ estimated based on channel matrix $H_{N_R \times 2}$ as follows:

$$\tilde{H}_{N_R \times 2} = \begin{bmatrix} H_{N_R \times 2} & 0_{N_R \times 2} \\ 0_{N_R \times 2} & H^*_{N_R \times 2} \end{bmatrix}.$$

The logic flow 200 may comprise providing subcarrier beamformers with corresponding space-time beamformer weights at block 208. In various embodiments, such as in closed-loop MIMO systems, the beamformer weights may be provided to transmit and received space-time subcarrier beamformers. In such embodiments, joint space-time beamforming optimization of transmit and receive beamformers may be achieved for STC MIMO cochannel interference cancellation. This joint TX-RX space-time beamforming optimization may provide a significant improvement in bit error rate (BER) performance improvement over open-loop systems employing the ST CIC technique at the receiver side only. The embodiments are not limited in this context.

The logic flow 200 may comprise applying space-time beamformer weights to stacked symbols at block 210. In various embodiments, RX space-time beamformer weights may be applied to stacked OFDM symbols at the receiver side to produce linear estimates of the transmitted signal. In various embodiments, such as in closed-loop MIMO systems, TX beamformer weights may be applied to stacked transmit symbols on each subcarrier or each subcarriers set. The embodiments are not limited in this context.

Figure 3:
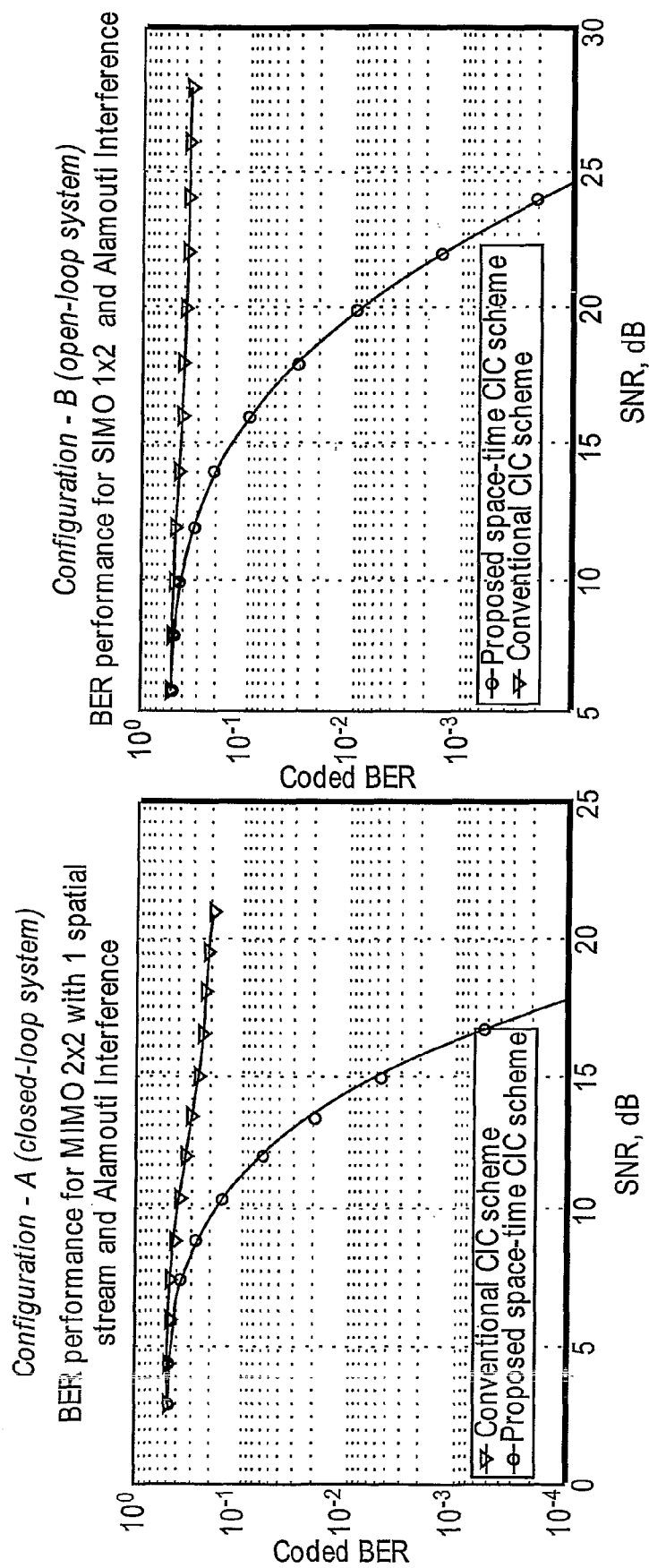
FIG. 3 illustrates one embodiment of system performance.

FIG. 3 illustrates one embodiment of system performance. FIG. 3 illustrates one embodiment of BER performance 300 of an ST CIC technique for A) a closed-loop MIMO 2×2 (2 TX-2 RX) system with one spatial stream and Alamouti cochannel interference and B) an open-loop SIMO 1×2 (1 TX-2 RX) system and Alamouti cochannel interference. In this embodiment, system performance of the ST CIC technique is illustrated for open and closed-loop OFDM systems based on the IEEE 802.11a standard with no constraints on TX-RX beamforming. In this embodiment, MMSE criterion was applied for calculation of optimal beamformers weights, the Rayleigh channel model with exponential profile and 50 ns delay spread was used, and a signal to interference ratio (SIR) was chosen equal to 3 dB. Coded BER of an OFDM receiver was evaluated for 64-QAM modulation with code rate ⅔. The embodiments are not limited in this context.

As shown in configurations A and B by the curves marked by triangles, the conventional ("space-only") open and closed loop systems with 2 receive antennas do not operate in the presence of space-time Alamouti interference. As such, employing conventional spatial only signal processing techniques requires at least one additional antenna element at the receiver side to cancel Alamouti interference.

As shown in configurations A and B by the curves marked by circles, the ST CIC technique allows the suppressing of Alamouti interference without using additional antenna elements at the receiver side. It is noted that in the case of a closed-loop MIMO 2×2 system, the ST CIC technique achieves the joint space-time optimization of transmit and receive beamformers providing more than 5-6 dB of the BER performance improvement over the open-loop SIMO 1×2 system with ST CIC scheme at the receiver side only. The embodiments are not limited in this context.

In various embodiments, the ST CIC technique may provide CIC for different types of interferences and, in particular, space-time coded interferences that cause performance degradation in a MIMO system. The ST CIC technique may improve performance of a MIMO system relative to traditional "space-only" CIC schemes. The ST CIC technique exploits both space and time correlation of interference and useful signals. The ST CIC technique may provide improved performance of a MIMO system in the presence of space-time coded interferences by exploiting specific space-time correlation properties of the interference signals.

In various embodiments, the ST CIC technique may achieve cancellation of space-time coded interference through joint space-time optimization of transmit and receive beamformer weights by exploiting spatial and time correlation of interference signals. The ST CIC technique may achieve joint TX-RX space-time beamforming optimization at the transmit and receive sides in the presence of STC cochannel interference. The ST CIC technique may achieve BER and throughput performance improvement in the presence of STC cochannel interferences without using additional antenna elements.

In various embodiments, the ST CIC technique may be applied for both closed-loop and open-loop applications, such as open or closed-loop MIMO systems and MIMO-OFDM systems. The ST CIC technique is robust to different types of MIMO co-channel interferences. The ST CIC technique can be used in multimode synchronous MIMO-OFDM communication system for long distances with severe interference and noise environment.

Figure 4:
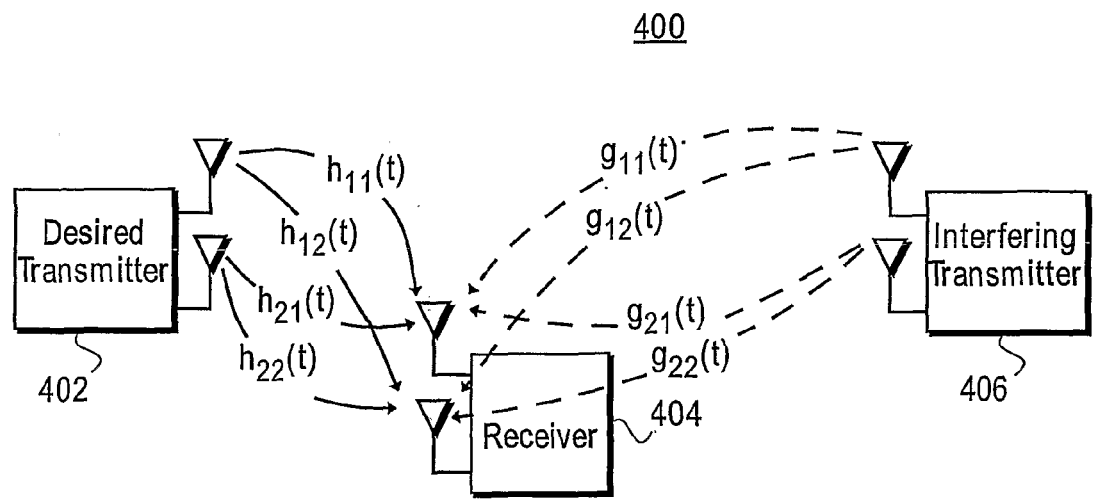
FIG. 4 illustrates one embodiment of a system.

FIG. 4 illustrates one embodiment of a system. FIG. 4 illustrates a block diagram of a system of a communications system 400. In various implementations, the communications system 400 may be arranged to perform a low-complexity CIC technique.

The communications system 400 may comprise a desired transmitter node 402, a receiver node 404, and an interfering transmitter node 406. In various embodiments, the receiver node 404 listens on a downlink to a desired base station and identifies the strongest interfering base station by scanning all the significant base stations.

In one embodiment, the interfering transmitter node 406 may comprise a space-time block code (STBC) interferer. In this embodiment, the two links send STBC and codeword symbols or the STBC symbols are aligned in time (e.g., OFDM symbols). In this embodiment, the baseband signal model in frequency subcarrier may be represented as follows:

$$\begin{bmatrix} r_1(1) \\ r_2(1) \\ r_1^*(2) \\ r_2^*(2) \end{bmatrix} =$$

$$\underbrace{\begin{bmatrix} h_{11}(1) & h_{12}(1) \\ h_{21}(1) & h_{12}(1) \\ h_{12}^*(1) & -h_{11}^*(2) \\ h_{22}^*(2) & -h_{21}^*(2) \end{bmatrix}}_{H} \underbrace{\begin{bmatrix} s_1 \\ s_2 \end{bmatrix}}_{s} + \underbrace{\begin{bmatrix} g_{11}(1) & g_{12}(1) \\ g_{12}(1) & g_{22}(1) \\ g_{12}^*(2) & -g_{11}^*(2) \\ g_{22}^*(2) & -g_{21}^*(2) \end{bmatrix}}_{G} \underbrace{\begin{bmatrix} x_1 \\ x_2 \end{bmatrix}}_{x} + \underbrace{\begin{bmatrix} n_1(1) \\ n_2(1) \\ n_1^*(2) \\ n_2^*(2) \end{bmatrix}}_{n} =$$

$$\underbrace{[H \ G]}_{M} \begin{bmatrix} s \\ x \end{bmatrix} + n$$

where:
Alamouti codes are sent,
two receive antennas are at the receiver,
the index in parentheses is OFDM symbol index, and
the transmission power of the desired signals s and interfering signals x are factored in the corresponding channel matrixes H and G respectively, and thus each entry of s and x has unit power.

In various embodiments, the transmission power of each OFDM symbol can be obtained by decoding the information in the header of the frames (e.g., DL_MAP of 802.16). Although the two headers are cochannel, the repetition coding and different scrambling sequences enable the decoding of the two headers. Similarly, the pilots on the two links can be decoded by the receiver node 404. As such, the channel matrixes H and G can be estimated at the receiver node 404, respectively.

In another embodiment, the interfering transmitter node 406 may comprise a single-antenna interferer. In this embodiment, the desired link sends STBC and the interfering link sends a single spatial stream using one antenna. In this case, the baseband signal model in frequency subcarrier may be represented as follows:

$$\begin{bmatrix} r_1(1) \\ r_2(1) \\ r_1^*(2) \\ r_2^*(2) \end{bmatrix} =$$

$$\underbrace{\begin{bmatrix} h_{11}(1) & h_{12}(1) \\ h_{21}(1) & h_{22}(1) \\ h_{12}^*(1) & -h_{11}^*(2) \\ h_{22}^*(1) & -h_{21}^*(2) \end{bmatrix}}_{H} \begin{bmatrix} s_1 \\ s_2 \end{bmatrix} + \underbrace{\begin{bmatrix} g_{11}(1) & 0 \\ g_{21}(1) & 0 \\ 0 & g_{11}^*(2) \\ 0 & g_{21}^*(2) \end{bmatrix}}_{G} \begin{bmatrix} x_1 \\ x_2^* \end{bmatrix} + \underbrace{\begin{bmatrix} n_1(1) \\ n_2(1) \\ n_1^*(2) \\ n_2^*(2) \end{bmatrix}}_{n} =$$

$$\underbrace{[H \ G]}_{M} \begin{bmatrix} s \\ x \end{bmatrix} + n$$

In various embodiments, the receiver node 404 may comprise an MMSE filter module to perform the low-complexity CIC technique. In one embodiment, the receiver node comprises an MMSE filter module for $$\begin{bmatrix} s \\ x \end{bmatrix}:$$

$$W = (M^H M + \sigma^2 I)^{-1} M^H \quad \text{(a)}$$

Or $$W = M^H (M M^H + \sigma^2 I)^{-1} \quad \text{(b)}$$

Equation (a) requires the knowledge of G while equation (b) only needs the covariance matrix of the received signal vector.

The MMSE filter for s is the first two rows of W. i.e. $W_{1:2,:}$. The straightforward implementation of both (a) and (b) requires a 4×4 matrix inversion, which is of very high complexity for WiMAX systems with large numbers of subcarriers (e.g., 1024 and 2048 subcarriers).

In various embodiments, the MMSE filter module may perform the low-complexity CIC technique as follows. If the channel is treated as approximately static across two OFDM symbols, the inversion portion of (a) and (b) may be represented as:

$$M^H M + \sigma^2 I = \begin{bmatrix} H^H H & H^H G \\ G^H H & G^H G \end{bmatrix} + \sigma^2 I = \underbrace{\begin{bmatrix} c_1 I & A \\ A^H & c_2 I \end{bmatrix}}_{P},$$

where a quasi-static channel is assumed, i.e. $h_{ij}(1) = h_{ij}(2)$ and $g_{ij}(1) = g_{ij}(2)$.

Since P is Hermitian, its inversion is also Hermitian. Let the inversion to be:

$$P^{-1} = \begin{bmatrix} B & C \\ C^H & D \end{bmatrix}.$$

Then, $$P^{-1}P = \begin{bmatrix} B & C \\ C^H & D \end{bmatrix} \begin{bmatrix} c_1 I & A \\ A^H & c_2 I \end{bmatrix} = \begin{bmatrix} I & \\ & I \end{bmatrix}$$

$$c_1 B + CA^H = I \quad (1)$$

$$BA + c_2 C = 0 \quad (2)$$

$$DA^H + c_1 C^H = 0 \quad (3)$$

$$c_2 D + C^H A = I \quad (4)$$

From (1) and (2), $$B = \left(c_1 I - \frac{1}{c_2} AA^H\right)^{-1} \quad (5)$$

$$C = -BA \quad (6)$$

From (3) and (4), $$D = \left(c_2 I - \frac{1}{c_1} A^H A\right)^{-1} \quad (7)$$

Equations (5) and (7) require inversions of two 2×2 matrixes. Since the MMSE filter for s is the first two rows of W, only the first two rows of $$P^{-1} = \begin{bmatrix} B & C \\ C^H & D \end{bmatrix}$$

are needed. Therefore, only B and C are needed, and thus only one 2×2 inversion is needed if (a) is employed and G is known. The embodiments are not limited in this context.

Figure 5:
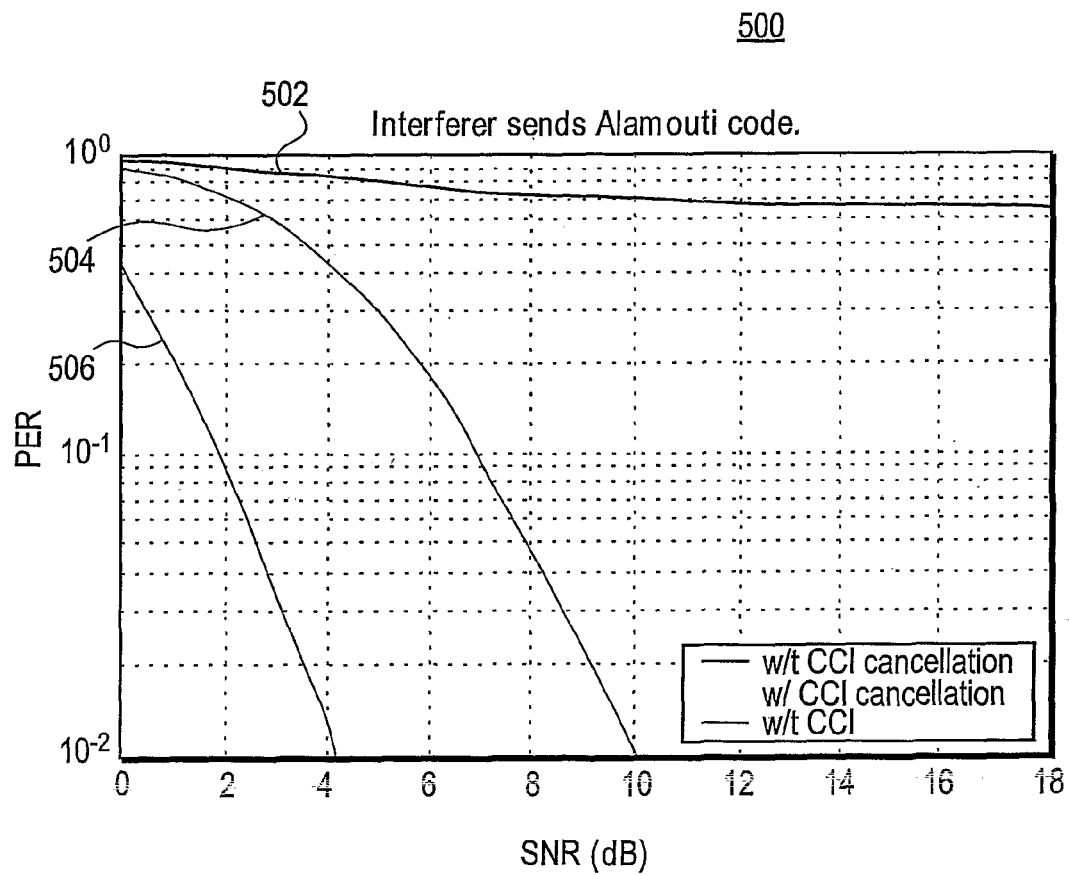
FIG. 5 illustrates one embodiment of system performance.

FIG. 5 illustrates one embodiment of system performance. FIG. 5 illustrates one embodiment of packet error rate (PER) performance 500 of a low-complexity CIC technique for a system in which an interferer sends Alamouti code.

In this embodiment, system performance of the low-complexity CIC technique is illustrated for ITU-R Pedestrian B with a vehicle speed 3 km/h. The packet size is 64 bytes. The modulation of the desired link is 802.16e partial usage of subchannels (PUSC) frequency permutation, Alamouti STBC, QPSK, and convolutional code with rate ½. The modulation of the interfering link is 802.16e PUSC frequency permutation, QPSK, and convolutional code with rate ½. The SIR is equal to 0 dB. The embodiments are not limited in this context.

Plot 502 represents PER performance without CIC. Plot 504 represents PER performance with the low-complexity CIC technique. Plot 506 represents PER performance without cochannel interference. The conventional receiver (that ignores cochannel interference) does not work in the presence of equal power STBC interference. As demonstrated, the low-complexity CIC technique removes cochannel interference. The embodiments are not limited in this context.

Figure 6:
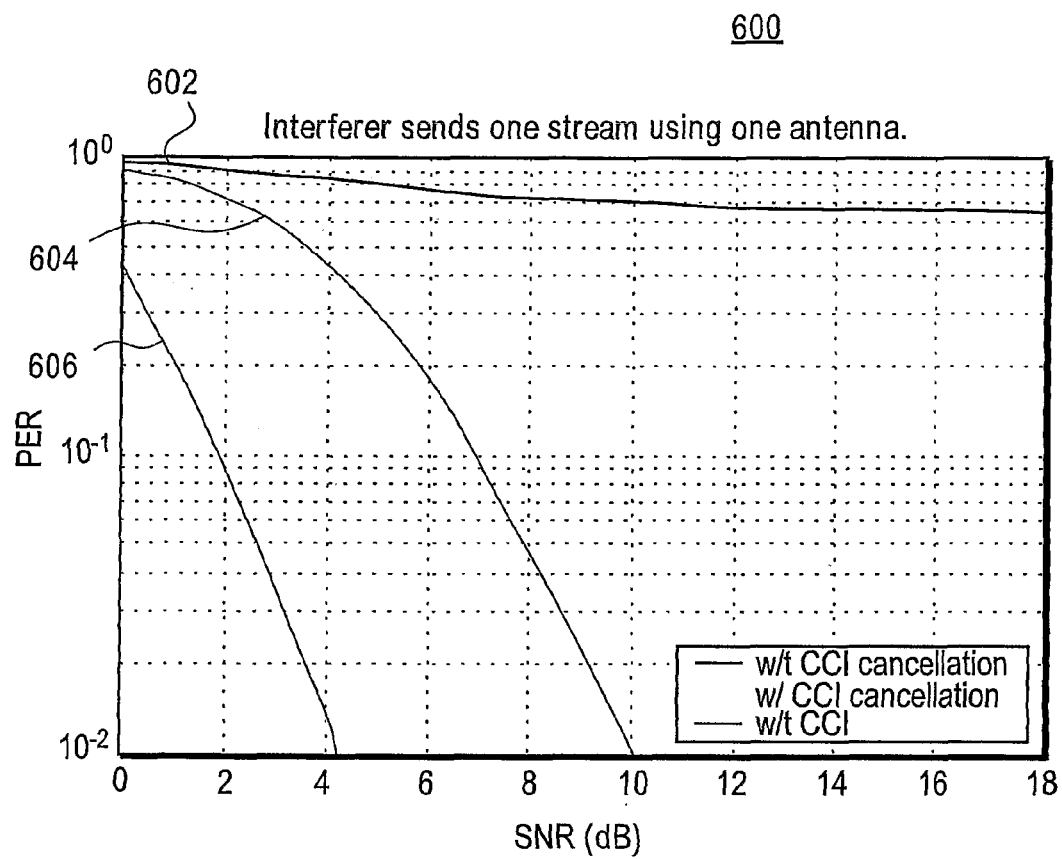
FIG. 6 illustrates one embodiment of system performance.

FIG. 6 illustrates one embodiment of system performance. FIG. 6 illustrates one embodiment of PER performance 600 of a low-complexity CIC technique for a system in which an interferer sends one stream using one antenna.

In this embodiment, system performance of the low-complexity CIC technique is illustrated for ITU-R Pedestrian B with a vehicle speed 3 km/h. The packet size is 64 bytes. The modulation of the desired link is 802.16e partial usage of subchannels (PUSC) frequency permutation, Alamouti STBC, QPSK, and convolutional code with rate ½. The modulation of the interfering link is 802.16e PUSC frequency permutation, QPSK, and convolutional code with rate ½. The SIR is equal to 0 dB. The embodiments are not limited in this context.

Plot 602 represents PER performance without CIC. Plot 604 represents PER performance with the low-complexity CIC technique. Plot 606 represents PER performance without cochannel interference. The conventional receiver (that ignores cochannel interference) does not work in the presence of equal power STBC interference. As demonstrated, the low-complexity CIC technique removes cochannel interference. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a node to perform space-time cochannel interference cancellation for a multicarrier communications system, said node comprising:
a time stacking module to stack consecutive subcarrier signals for a period of time equal to several symbols, said time stacking module to use both spatial and time correlation properties of at least one of useful signals and interference signals; and
a space-time subcarrier beamformer module to perform space-time subcarrier beamforming by applying space-time beamformer weights to stacked symbols on one or more subcarriers, said space-time beamformer weights calculated based on spatial and time correlation properties of one or more interference signals.

2. The apparatus of claim 1, wherein said space-time beamforming weights are received by said space-time subcarrier beamformer module from a beamforming weights calculator module.

3. The apparatus of claim 2, wherein said node comprises a transmitter node and said space-time beamformer weights comprise transmit space-time beamformer weights received through a feedback channel from a receiver node comprising said beamforming weights calculator module.

4. The apparatus of claim 2, wherein said node comprises a receiver node including said beamforming weights calculator module, and said space-time beamformer weights comprise receive space-time beamformer weights.

5. The apparatus of claim 2, wherein said beamforming weights calculator module is to perform joint space-time beamforming optimization for both a transmit space-time subcarrier beamformer module and a receive space-time subcarrier beamformer module.

6. The apparatus of claim 2, wherein said beamforming weights calculator module is to calculate said space-time beamformer weights based on channel estimates and interference and noise estimates.

7. The apparatus of claim 6, wherein said interference and noise estimates comprise interference and noise space-time correlation matrix estimates.

8. The apparatus of claim 1, further comprising a space-time correlation matrix estimator to extract interference and noise signals and to calculate interference and noise space-time correlation matrix estimates for at least one of each subcarrier and each set of adjacent subcarriers, said space-time beamformer weights based on said interference and noise space-time correlation matrix estimates.

9. The apparatus of claim 1, wherein said symbols comprise orthogonal frequency division multiplexing symbols, and said cochannel interference comprises spatially and time correlated interference.

10. The apparatus of claim 1, wherein said multicarrier communications system comprises at least one of an open loop communications system and a closed loop communications system, and said node is to perform said space-time cochannel interference cancellation without additional antenna elements required by spatial only cochannel interference cancellation.

11. A system, comprising:
at least one antenna; and
a node to couple to said at least one antenna over a multicarrier communication channel and to perform space-time cochannel interference cancellation, said node comprising:
a time stacking module to stack consecutive subcarrier signals for a period of time equal to several symbols; and
a space-time subcarrier beamformer module to perform space-time subcarrier beamforming by applying space-time beamformer weights to stacked symbols on one or more subcarriers, said space-time beamformer weights calculated based on spatial and time correlation properties of one or more interference signals.

12. The system of claim 11, wherein said space-time beamforming weights are received by said space-time subcarrier beamformer module from a beamforming weights calculator module.

13. The system of claim 12, wherein said node comprises a transmitter node and said space-time beamformer weights comprise transmit space-time beamformer weights received through a feedback channel from a receiver node comprising said beamforming weights calculator module.

14. The system of claim 12, wherein said node comprises a receiver node including said beamforming weights calculator module, and said space-time beamformer weights comprise receive space-time beamformer weights.

15. The system of claim 12, wherein said beamforming weights calculator module is to perform joint space-time beamforming optimization for both a transmit space-time subcarrier beamformer module and a receive space-time subcarrier beamformer module.

16. The system of claim 12, wherein said beamforming weights calculator module is to calculate said space-time beamformer weights based on channel estimates and interference and noise estimates.

17. The system of claim 16, wherein said interference and noise estimates comprise interference and noise space-time correlation matrix estimates.

18. The system of claim 11, further comprising a space-time correlation matrix estimator to extract interference and noise signals and to calculate interference and noise space-time correlation matrix estimates for each subcarrier, said space-time beamformer weights based on said interference and noise space-time correlation matrix estimates.

19. The system of claim 11, wherein said symbols comprise orthogonal frequency division multiplexing symbols, and said cochannel interference comprises spatially and time correlated interference.

20. The system of claim 11, wherein said multicarrier communication channel comprises a multiple-input multiple-output channel and said node is to perform said space-time cochannel interference cancellation without additional antenna elements required by spatial only cochannel interference cancellation.

21. A method to perform space-time cochannel interference cancellation, comprising:
   stacking consecutive subcarrier signals for a period of time equal to several symbols;
   calculating space-time beamformer weights based on spatial and time correlation properties of one or more interference signals; and
   applying said space-time beamformer weights to stacked symbols on one or more subcarriers.

22. The method of claim 21, further comprising:
   extracting interference and noise signals; and
   calculating interference and noise space-time correlation matrix estimates for at least one of each subcarrier and each set of adjacent subcarriers.

23. The method of claim 22, further comprising calculating said space-time beamformer weights based on said interference and noise space-time correlation matrix estimates.

24. The method of claim 22, further comprising calculating said space-time beamformer weights based on channel estimates.

25. The method of claim 21, further comprising providing subcarrier beamformers with corresponding space-time beamformer weights.

26. The method of claim 25, further comprising performing joint space-time beamforming optimization for both transmit space-time beamformers and receive space-time subcarrier beamformers.

27. The method of claim 25, further comprising providing receive subcarrier beamformers with receive space-time beamformer weights.

28. The method of claim 25, further comprising providing transmit subcarrier beamformers with transmit space-time beamformer weights.

29. The method of claim 21, wherein said symbols comprise orthogonal frequency division multiplexing symbols, and said cochannel interference comprises Alamouti space-time interference.

30. The method of claim 21, wherein said multicarrier communication channel comprises a multiple-input multiple-output channel and said space-time cochannel interference cancellation is performed without additional antenna elements required by spatial only cochannel interference cancellation.

* * * * *

UNITED STATES PATENT AND TRADEMARK OFFICE
CERTIFICATE OF CORRECTION

PATENT NO. : 8,064,532 B2
APPLICATION NO. : 12/088496
DATED : November 22, 2011
INVENTOR(S) : Alexander Alexandrovich Maltsev et al.

Page 1 of 1

It is certified that error appears in the above-identified patent and that said Letters Patent is hereby corrected as shown below:

On the first page, in field (75), in "Inventors", in column 1, line 7, delete "Quinghua Li," and insert -- Qinghua Li, --, therefor.

Signed and Sealed this

Thirty-first Day of January, 2012

David J. Kappos
*Director of the United States Patent and Trademark Office*